US 8,018,989 B2

(12) United States Patent
Nygaard, Jr. et al.

(10) Patent No.: US 8,018,989 B2
(45) Date of Patent: Sep. 13, 2011

(54) SYSTEM AND METHOD FOR ADJUSTING A SERIAL COMMUNICATIONS LINK

(75) Inventors: Richard A. Nygaard, Jr., Colorado Springs, CO (US); Robert Saponas, Colorado Springs, CO (US); William C. Schulze, Monument, CO (US); Hugh S. Conely Wallace, Fort Collins, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 923 days.

(21) Appl. No.: 11/962,574

(22) Filed: Dec. 21, 2007

(65) Prior Publication Data

US 2010/0309968 A1 Dec. 9, 2010

(51) Int. Cl.
*H04B 3/46* (2006.01)
(52) U.S. Cl. ........................................ 375/224

(58) Field of Classification Search .................. 375/222, 375/224
See application file for complete search history.

(56) References Cited

U.S. PATENT DOCUMENTS

| 5,764,924 A * | 6/1998 | Hong ............................ 710/300 |
| 7,505,331 B1 * | 3/2009 | Camarota ................ 365/189.08 |
| 7,657,807 B1 * | 2/2010 | Watkins et al. ............... 714/727 |

* cited by examiner

*Primary Examiner* — Don N Vo (57) ABSTRACT

A system for adjusting a serial communications link includes a system under test including at least one transmitter and at least one receiver coupled together via a serial data communications link, wherein at least one of the transmitter and the receiver has at least one tunable parameter, at least one controller coupled to at least one of a transmitter and a receiver via a joint test action group JTAG interface, and logic configured to adjust the at least one tunable parameter to optimize a performance of the serial data communications link.

19 Claims, 7 Drawing Sheets

SYSTEM AND METHOD FOR ADJUSTING A SERIAL COMMUNICATIONS LINK

BACKGROUND

A typical high speed serial data communications link operates by combining a clock signal and a data signal into one signal stream. Generally, a transmitter and a receiver are located at opposite ends of the serial data communications link. The receiver recovers the clock signal, and then uses the recovered clock signal to sample the data signal. The data signal comprises a series of ones and zeroes, indicated by high and low voltage levels. The data signal transitions from high to low, or low to high, to convey information. The transitions should occur away from the point in time when the recovered clock indicates that the level of the data signal is to be sampled.

A condition referred to as jitter occurs when the transitions in the data signal fail to occur at a preferred time relative to the recovered clock signal. Noise, poor signal propagation conditions, and imperfect transmitter and receiver design are common causes of jitter. Jitter generally manifests as a variation in the location of the transitions in the data signal relative to the clock signal. If the jitter is sufficiently severe, the data signal may transition at a point in time when it is due to be sampled, or even later. In such cases, the received data bit will be in error.

The period of the recovered clock defines the data rate. The period for transmission of one bit is called a unit interval (UI). By convention, the time period of a unit interval is normalized to 0.0 at the beginning of each interval and to 1.0 at the end of a unit interval. The data signal typically transitions from logic high to logic low or from logic low to logic high at the beginning and/or end of each unit interval. The data value is typically sampled in the middle of the unit interval, at a time corresponding to 0.5 UI, to avoid sampling the data signal during a data transition. Some receivers are designed to always sample in the middle of the unit interval. Other receivers are designed to allow sampling at an arbitrary location (phase) within the unit interval.

Figure 1:
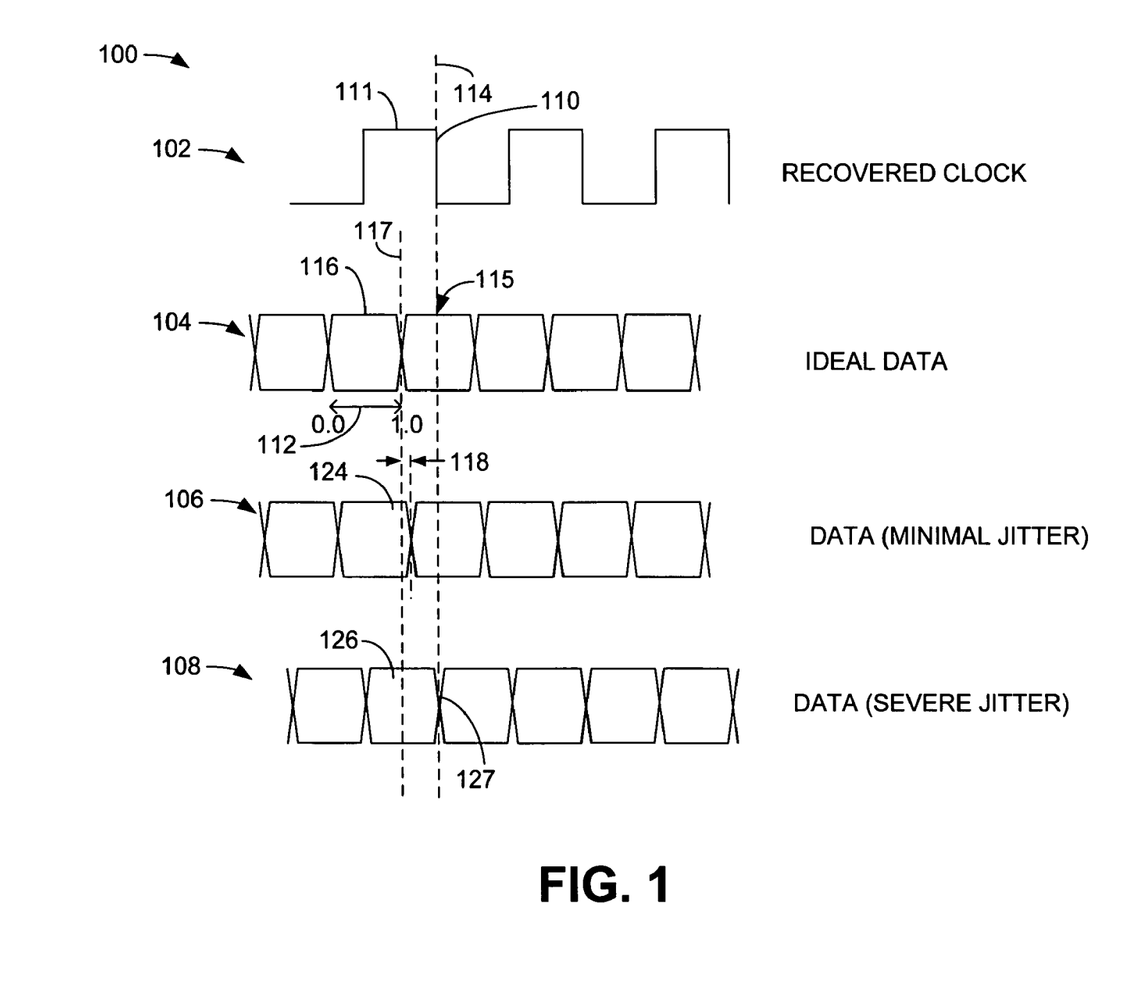
FIG. 1 is a graphical illustration showing the effect of jitter on a serial data communications link.

FIG. 1 is a graphical illustration 100 showing the effect of jitter on a serial data communications link. The diagram 100 includes a recovered clock signal 102 and an ideal data signal 104. In this example, the preferred alignment time is illustrated at 114 on an exemplary negative transitioning clock edge 110 of a clock pulse 111. The ideal data signal 104 includes an exemplary data transitioning edge 117 on a pulse 116. The unit interval 112 of the pulse 116 is shown from 0.0 through 1.0. As shown in FIG. 1, the alignment time 114 and the ideal data signal 104 transitioning at 0.5 UI with respect to the alignment time 114 results in the nominal sample location at 0.5 UI, illustrated at 115.

A data signal having minimal jitter is illustrated at 106. The data signal 106 is offset in time from the ideal data signal 104, and from the clock signal 102, by an amount shown at 118. The data signal 106 includes an exemplary pulse 124. The jitter indicated at 118 is sufficiently small so that the pulse 124 is sampled at a point in time relative to the transitioning edge 110 of the clock signal 102 so that the sampled data represented by the pulse 124 will likely be accurate.

A data signal having significant jitter is illustrated at 108. The data signal 108 includes a pulse 126. In this example, a transitioning edge 127 of the pulse 126 occurs coincident to the nominal sample location 115. In this example, the negative transitioning edge 127 of the pulse 126 occurs coincident to the nominal sample time 115, so that when the data associated with the pulse 126 is sampled at the nominal sample time 115, the sampled value will be potentially in error.

It is desirable in serial data communications link design to ensure that the transmitter, channel, and receiver are all designed to keep jitter within acceptable bounds. An acceptable bound for jitter should also include a margin to allow for natural variation in hardware characteristics from device to device or over time and environmental changes for a single device. The Bit Error Ratio, BER, is representative of the ratio of erroneous bits received to the total number of bits transmitted during a defined period of time of operation of the serial data communications link. BER is a measurement known by those in the art and commonly used for assessing serial communications link quality. A BER measurement is performed by transmitting a known data pattern and performing a comparison of expected to actual data received at the receiver. Some transmitters and/or receivers include the ability to adjust various parameters. Therefore, it is desirable to have the ability to obtain the combination of transmitter and/or receiver settings that minimize jitter and optimize the operation of a serial data communications link.

SUMMARY

In accordance with an embodiment, a system for adjusting a serial communications link includes a system under test including at least one transmitter and at least one receiver coupled together via a serial data communications link, wherein at least one of the transmitter and the receiver has at least one tunable parameter, at least one controller coupled to at least one of a transmitter and a receiver via a joint test action group JTAG interface, and logic configured to adjust the at least one tunable parameter to optimize a performance of the serial data communications link.

Other embodiments and methods of the invention will be discussed with reference to the figures and to the detailed description.

BRIEF DESCRIPTION OF THE FIGURES

The invention will be described by way of example, in the description of exemplary embodiments, with particular reference to the accompanying figures.

DETAILED DESCRIPTION

The Institute of Electrical and Electronic Engineers (IEEE) has published a specified protocol for communicating with a single integrated circuit (IC) chip or a chain of chips. The communication protocol is promulgated by the joint test action group (JTAG) under the IEEE 1149.1 specification. This protocol allows external applications to both write and read from integrated circuits for debugging, and for other purposes. JTAG boundary scan started as a method of testing ICs and their interconnections using a shift register built into the chip so that inputs could be shifted in and the resulting outputs could be shifted out using only four I/O pins (clock, input data, output data, and state machine mode control). However, the IEEE 1149.1 specification also provides an application programmatic interface (API) that allows communication with registers on the chip on which the transmitters and receivers are located. This communication also allows for additional control of the transmitter and receiver associated with a serial data communications link.

While described below for use in an integrated circuit, the system and method for adjusting a serial communications link can be used to adjust the parameters of any serial data communications link, whether it uses a clock embedded with the data or transmitted alongside the data on an independent connection.

While generally implemented in software, the system and method for adjusting a serial communications link can be implemented in hardware, software, or a combination of hardware and software. If implemented in hardware, the system for adjusting a serial communications link can be implemented using specialized hardware elements and logic. When the system and method for adjusting a serial communications link is implemented in hardware or software, the logic can be used to control various components so that various operating aspects can be software-controlled. The software can be stored in a memory and executed by a suitable instruction execution system (e.g., a microprocessor). A hardware implementation of the system for adjusting a serial communications link can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

The software for the system and method for adjusting a serial communications link comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 2:
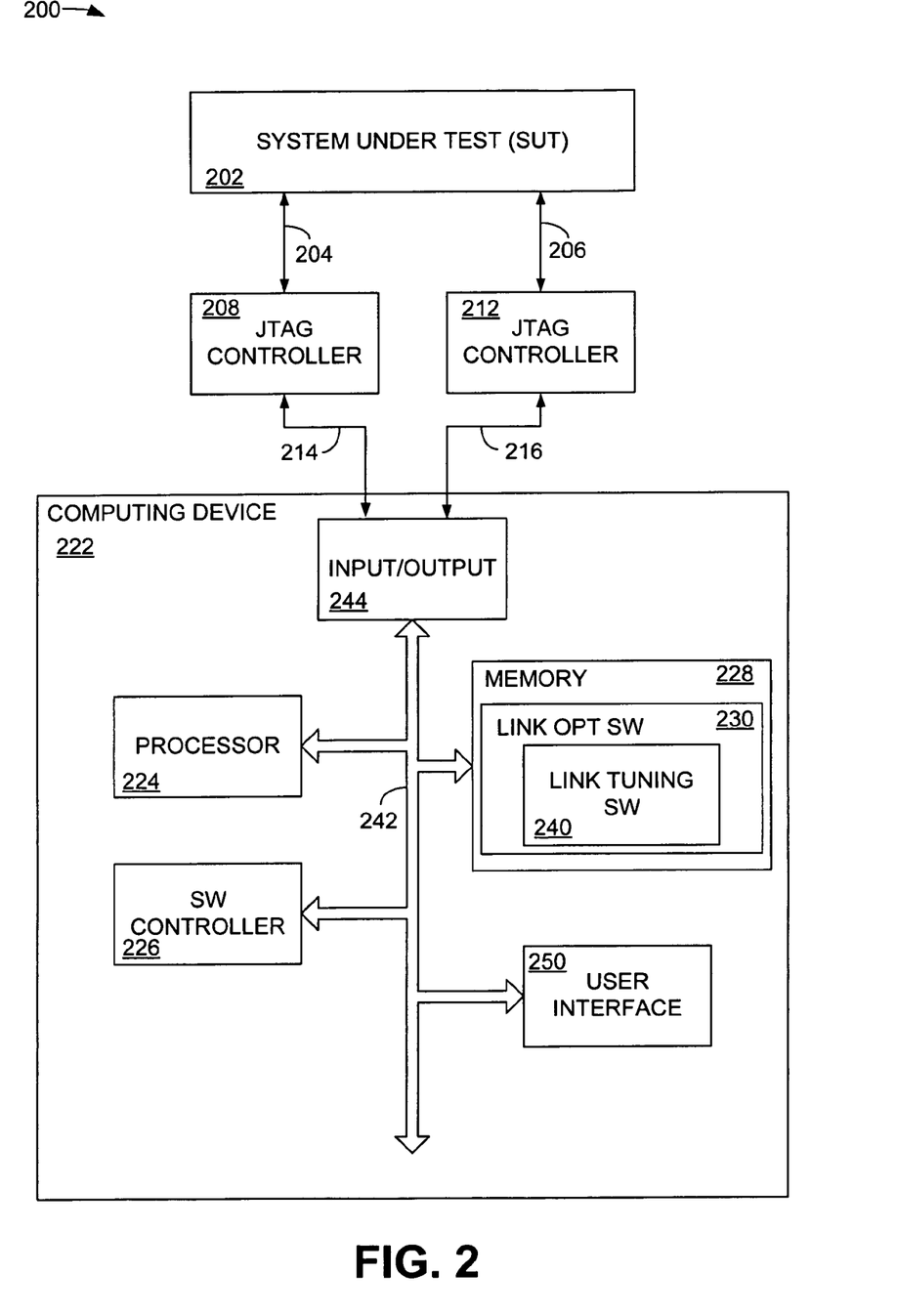
FIG. 2 is a schematic diagram illustrating an example of a system in which the system for adjusting a serial communications link can be implemented.

FIG. 2 is a schematic diagram illustrating an example of a system 200 in which the system for adjusting a serial communications link can be implemented. The system 200 includes a system under test (SUT) 202 connected to a computing device 222 via, in this example, a pair of JTAG controllers 208 and 212. The JTAG controllers 208 and 212 are configured to implement the communication protocol specified in IEEE standard 1149.1. However, other communication standards are contemplated and can be implemented by the JTAG controllers 208 and 212. Further, although two JTAG controllers are shown, a single JTAG controller may be implemented.

The system under test 202 can be, for example, an integrated circuit, a number of different integrated circuits, or any other circuitry that includes a serial communications link between at least two devices (not shown) within the system under test 202. The JTAG controller 208 is connected to the system under test 202 via connection 204 and is connected to the computing device 222 via connection 214. The JTAG controller 212 is connected to the system under test 202 via connection 206 and is connected to the computing device 222 via connection 216. The connections 214 and 216 can be any bi-directional data communication connection, such as, for example, a universal serial bus (USB), an RS-232 connection, a parallel connection, or any other bidirectional data connection known in the art.

The connections 204 and 206 can be any general-purpose communication connections capable of carrying the signals used by the JTAG, or other, controllers, such as for example, a five conductor signal cable carrying ground and the four signals (clock, input data, output data, and state machine control mode) defined by the IEEE 1149.1 JTAG standard.

The computing device 222 can be any general purpose computing device or specialized computing device, and typically includes a processor 224, a memory 228, a software controller 226, an input/output element 244 and a user interface 250 coupled together via interface 242. The interface 242 can be a physical connection, a logical connection, or a combination of physical and logical connections that enable bi-directional communication among the connected elements.

The memory 228 includes a number of software elements (not shown) that enable the computer 222 to operate. The memory 228 also includes link optimization software 230. The link optimization software 230 includes a number of different software components, and in this embodiment, includes link tuning software 240. As will be described below, the link tuning software 240 provides testing and adjustment functionality to the transmitters and receivers (not shown in FIG. 1) within the system under test 202.

The input/output element 244 provides the connectivity via connections 214 and 216 to the JTAG controllers 208 and 212, respectively. However, the JTAG controllers 208 and 212 can be coupled to the computing device 222 via other connections.

The user interface 250 provides visibility and control of the link optimization software 230 and the link tuning software 240. The user interface 250 provides a user with a graphical user interface that allows various aspects of the link optimization software 230 and the link tuning software 240 to be controlled. The graphical user interface also allows a user to control, adjust and tune various operating aspects of a transmitter and a receiver (not shown in FIG. 1) associated with a serial data communications link within the system under test 202. In addition, the graphical user interface provides visibility of the measurement results obtained from the system under test.

Figure 3:
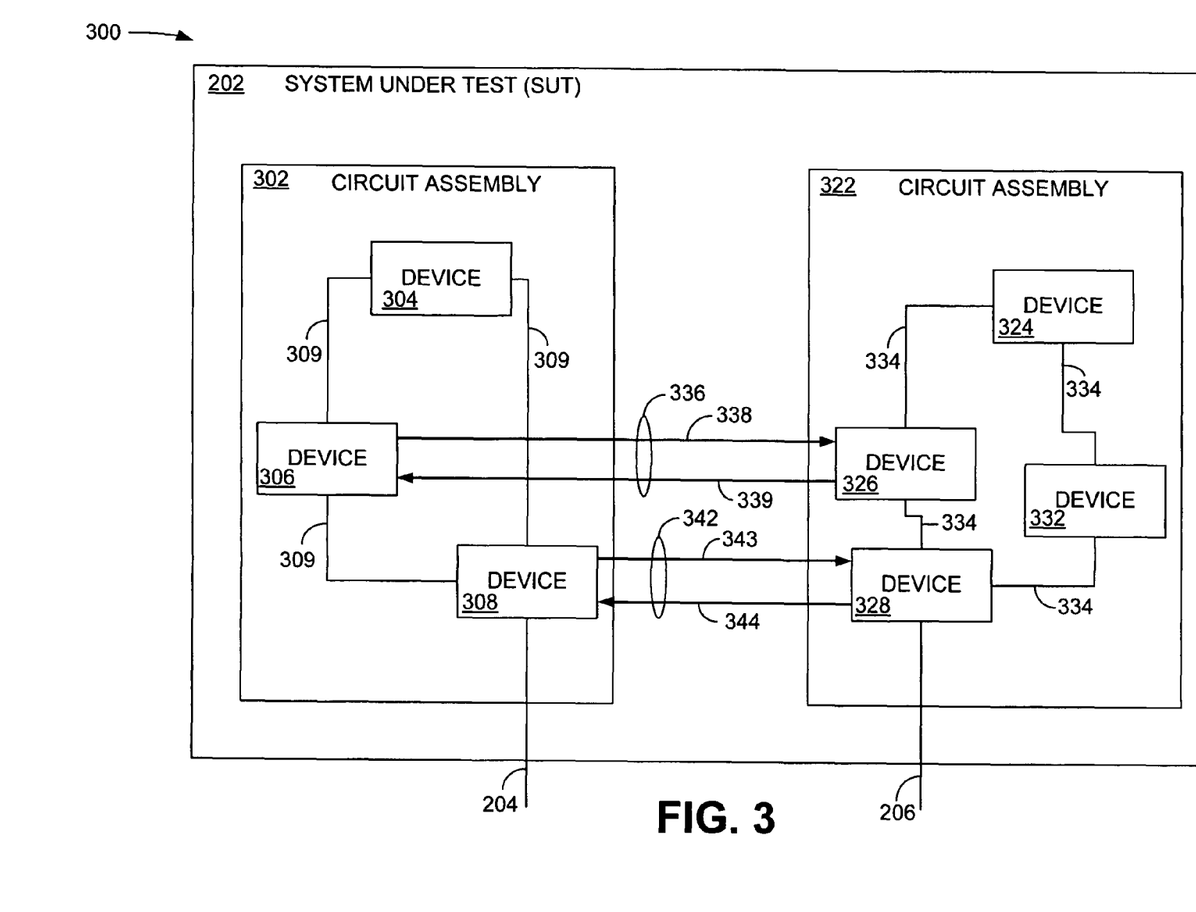
FIG. 3 is a schematic diagram illustrating the system under test of FIG. 2.

FIG. 3 is a schematic diagram 300 illustrating the system under test 202 of FIG. 2. In this example, the system under test 202 includes a circuit assembly 302 and a circuit assembly 322. Two circuit assemblies are shown for convenience of illustration. Any number of circuit assemblies can be implemented. The circuit assemblies 302 and 322 can be circuit boards, integrated circuit assemblies, or any type of element on which circuit devices are located. The circuit assembly 302 includes devices 304, 306 and 308. The devices 304, 306 and 308 can be any integrated circuit device, component, or combination of devices and components. At least some of the devices 304, 306 and 308 include a transmitter and a receiver. However, not all of the devices 304, 306 and 308 need include both a transmitter and a receiver.

The devices 304, 306 and 308 are connected via a scan chain 309. As known to those skilled in the art, a scan chain, such as the scan chain 309, can be formed by interconnecting various components and elements within each of the devices 304, 306 and 308. Some or all of the components and elements within each of the devices 304, 306 and 308 can be in communication via the scan chain 309, typically based upon JTAG control settings.

In this example, the system under test 202 also includes a circuit assembly 322. In this example, the circuit assembly 322 includes devices 324, 326, 328 and 332. The devices 324, 326, 328 and 332 can be any integrated circuit device, component, or combination of devices and components. At least some of the devices 324, 326, 328 and 332 include a transmitter and a receiver. However, not all of the devices 324, 326, 328 and 332 need include both a transmitter and a receiver.

The devices 324, 326, 328 and 332 are connected via a scan chain 334. As known to those skilled in the art, a scan chain, such as the scan chain 334, can be formed by interconnecting various components and elements within each of the devices 324, 326, 328 and 332. Some or all of the components and elements within each of the devices 324, 326, 328 and 332 can be in communication via the scan chain 334, typically based upon JTAG control settings.

The elements within the system under test 202 are shown for example purposes only. More or fewer devices, circuits, and scan chains may exist within the system under test 202.

In this example, the devices 306 and 326 are coupled via a serial communications link 336. The serial communications link 336 includes connections 338 and 339. In this example, the connection 338 is shown as extending in the direction from device 306 to device 326 and the connection 339 is shown as extending in the direction from device 326 to device 306. However, the direction of the connections 338 and 339 is arbitrary. The connection 338 and the connection 339 each generally comprise a differential pair of conductors having a controlled impedance, but are shown as a single line for ease of illustration. Typically, the serial communications link 336 allows the connection of a transmitter in one device and a receiver in the other device. The connection of a transmitter and receiver will be described below with respect to FIG. 4.

Similarly, the device 308 is connected to the device 328 via a serial communications link 342. The serial communications link 342 is similar to the serial communications link 336 and includes connections 343 and 344.

Although shown as connecting devices on separate circuit assemblies, such as circuit assemblies 302 and 322, a serial communications link can also be formed between a transmitter and receiver on devices located on the same circuit assembly. Further, a serial communications link can also be formed between a transmitter and a receiver located on the same device. All such serial communications links can be controlled and adjusted in accordance with the description to follow.

Figure 4:
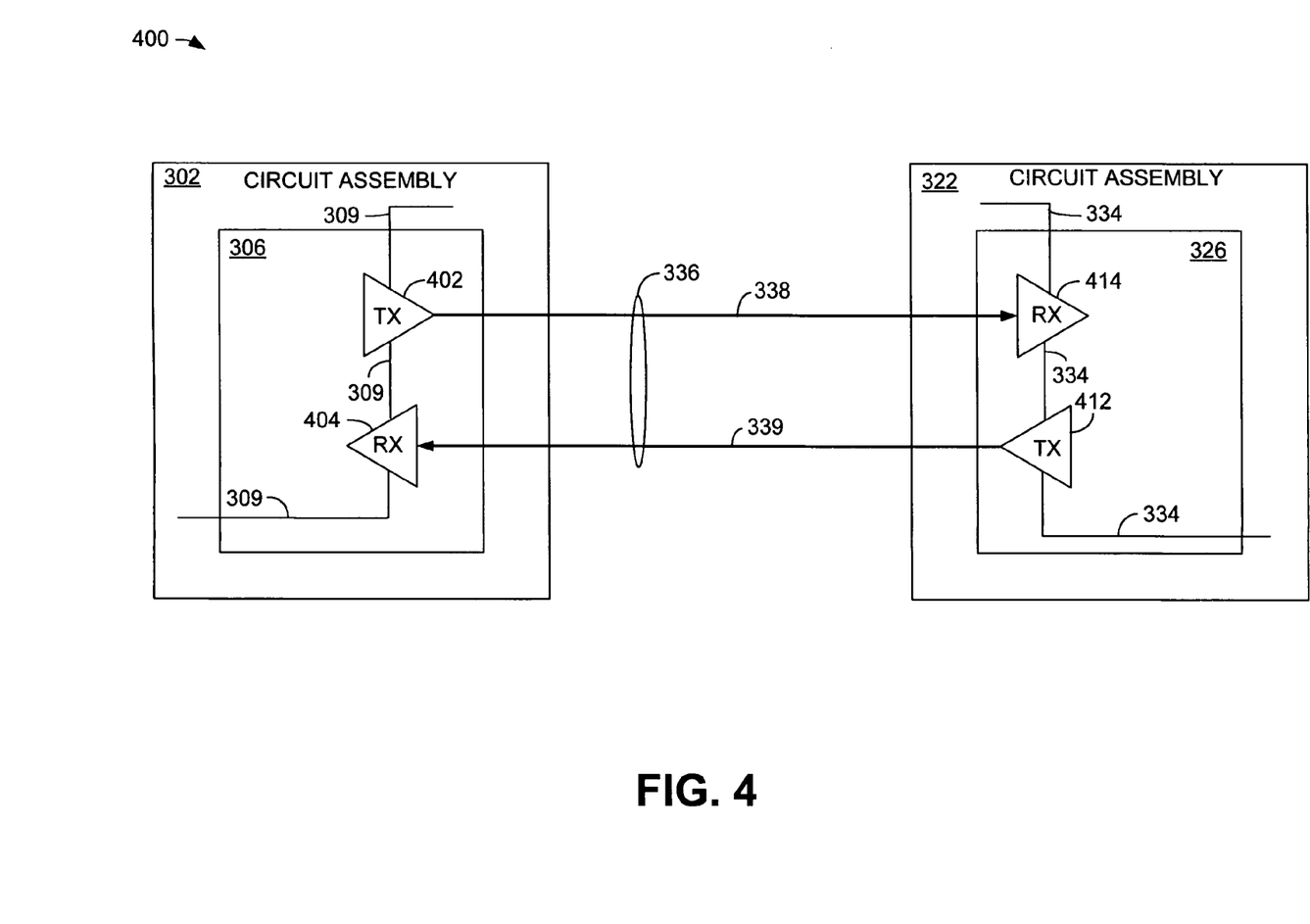
FIG. 4 is a schematic diagram illustrating in further detail the serial communications link between two devices of FIG. 3.

FIG. 4 is a schematic diagram 400 illustrating in further detail the serial communications link 336 between the device 306 and the device 326 of FIG. 3. The device 306 includes a transmitter 402 and a receiver 404. The device 326 includes a transmitter 412 and a receiver 414. The transmitters 402 and 412 can be any serial communication device transmitters having operating parameters that can be adjusted using, for example, a JTAG IEEE 1149.1, or similar, interface. For example, the data pattern, transmission speed, transmit pre-emphasis, drive signal strength and output impedance are examples of adjustable transmitter operating parameters.

The receivers 404 and 414 can be any serial communication device receivers having operating parameters that can be adjusted using, for example, a JTAG IEEE 1149.1, or similar, interface. For example, the data pattern, linear equalization, gain and decision feedback equalization (DFE) are examples of adjustable receiver operating parameters.

In this example, the transmitter 402 is connected to the receiver 414 via connection 338 and the transmitter 412 is connected to the receiver 404 via connection 339. In this manner, a serial communications link 336 is established between the device 306 and the device 326. It should be mentioned that although a single transmitter and receiver are shown in each of the devices 306 and 326, each of the devices 306 and 326 may include additional transmitters and receivers, the additional transmitters and receivers possibly being connected via other serial communications links.

The scan chain 309, which provides the control interface to the device 306, is shown as extending from a point external from the device 306, through the transmitter 402 and the receiver 404, and then off of the device 306. Similarly, the scan chain 334, which provides the control interface to the device 326, is shown as extending from a point external from the device 326, through the transmitter 412 and the receiver 414, and then off of the device 326. In this manner, individual operational aspects and parameters of each transmitter 402 and 412, and each receiver 404 and 414, can be individually controllable, adjustable, and variable, via the JTAG interface provided over connection 204 to the scan chain 309 and from connection 206 to the scan chain 334.

As will be described below, the link tuning software 240, operating through the software controller 226 and the JTAG controllers 208 and 212, can adjust the operating performance of the transmitters and receivers to optimize the performance of the serial communications link 336.

Figure 5:
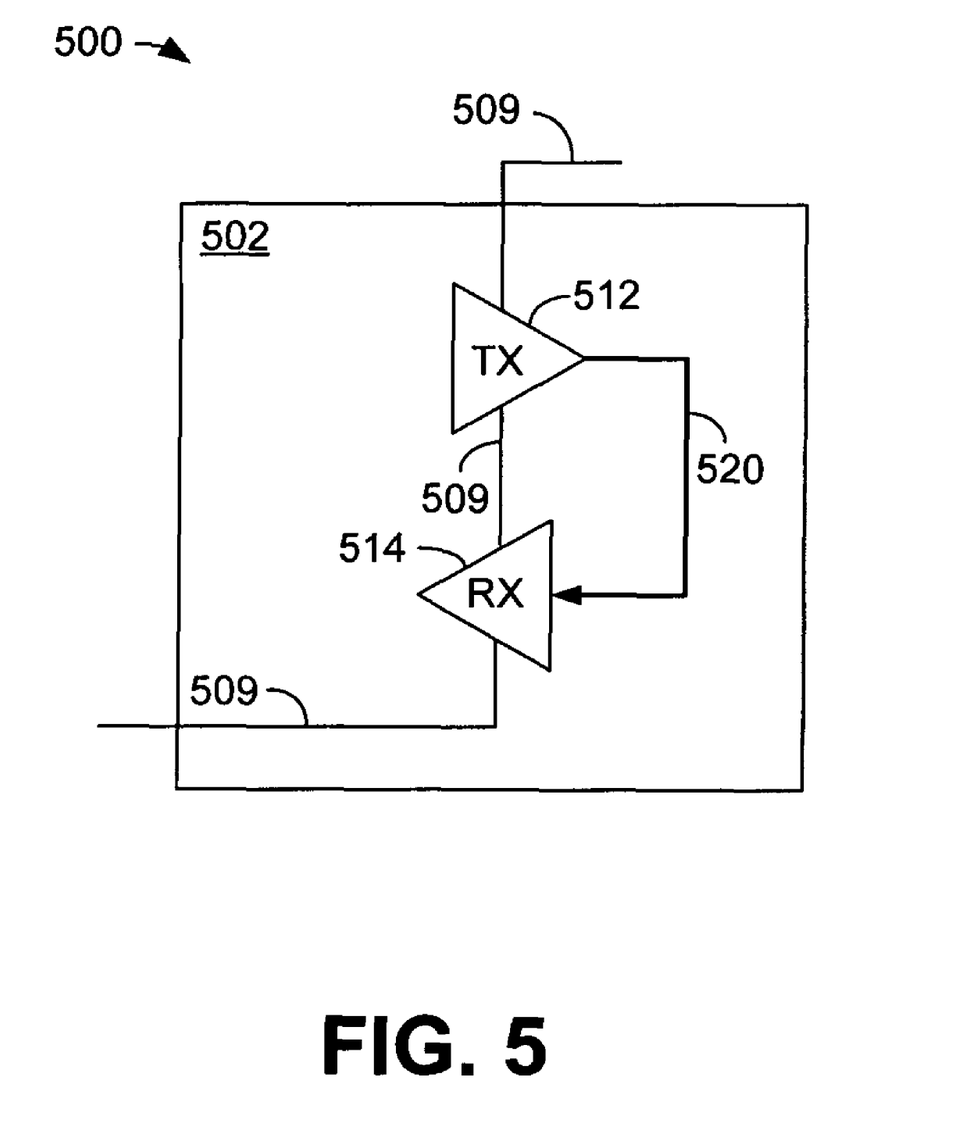
FIG. 5 is an alternative embodiment of the serial communications link shown in FIG. 4.

FIG. 5 is an alternative embodiment of the serial communications link shown in FIG. 4. The system 500 shown in FIG. 5 includes a device 502. The device 502 is similar to the devices 302 and 322 described above. The device 502 includes an exemplary transmitter 512 and an exemplary receiver 514. A single transmitter 512 and a single receiver 514 are shown for simplicity. A typical device 502 will contain many hundreds or thousands of transmitters and receivers.

The embodiment shown in FIG. 5 illustrates an environment referred to as a "loopback" test environment in which a transmitter and a receiver located on the same device are coupled together via a serial data communications link 520. The transmitter 512 and the receiver 514 are also coupled to a scan chain 509. The scan chain 509 is similar to the scan chain 309 described above. Alternatively, another loopback test configuration is referred to as an "external loopback" configuration in which an external signal path is connected to deliver the output of the transmitter 512 to the input of the receiver 514 via external cabling or other means.

The scan chain 509, which provides the control interface to the device 502, is shown as extending from a point external from the device 502, through the transmitter 512 and the receiver 514, and then off of the device 502. In this manner, individual operational aspects and parameters of the transmitter 512 and the receiver 514 can be individually controllable, adjustable, and variable, via the JTAG interface provided over connection 204 to the scan chain 509. In the embodiment shown in FIG. 5, a single JTAG controller, such as the JTAG controller 208 of FIG. 2, can be coupled to the scan chain 509 to control the transmitter 512 and the receiver 514.

The link tuning software 240, operating through the software controller 226 and the JTAG controllers 208 and 212, can adjust the operating performance of the transmitter 512 and the receiver 514 to optimize the performance of the serial communications link 520.

Figure 6:
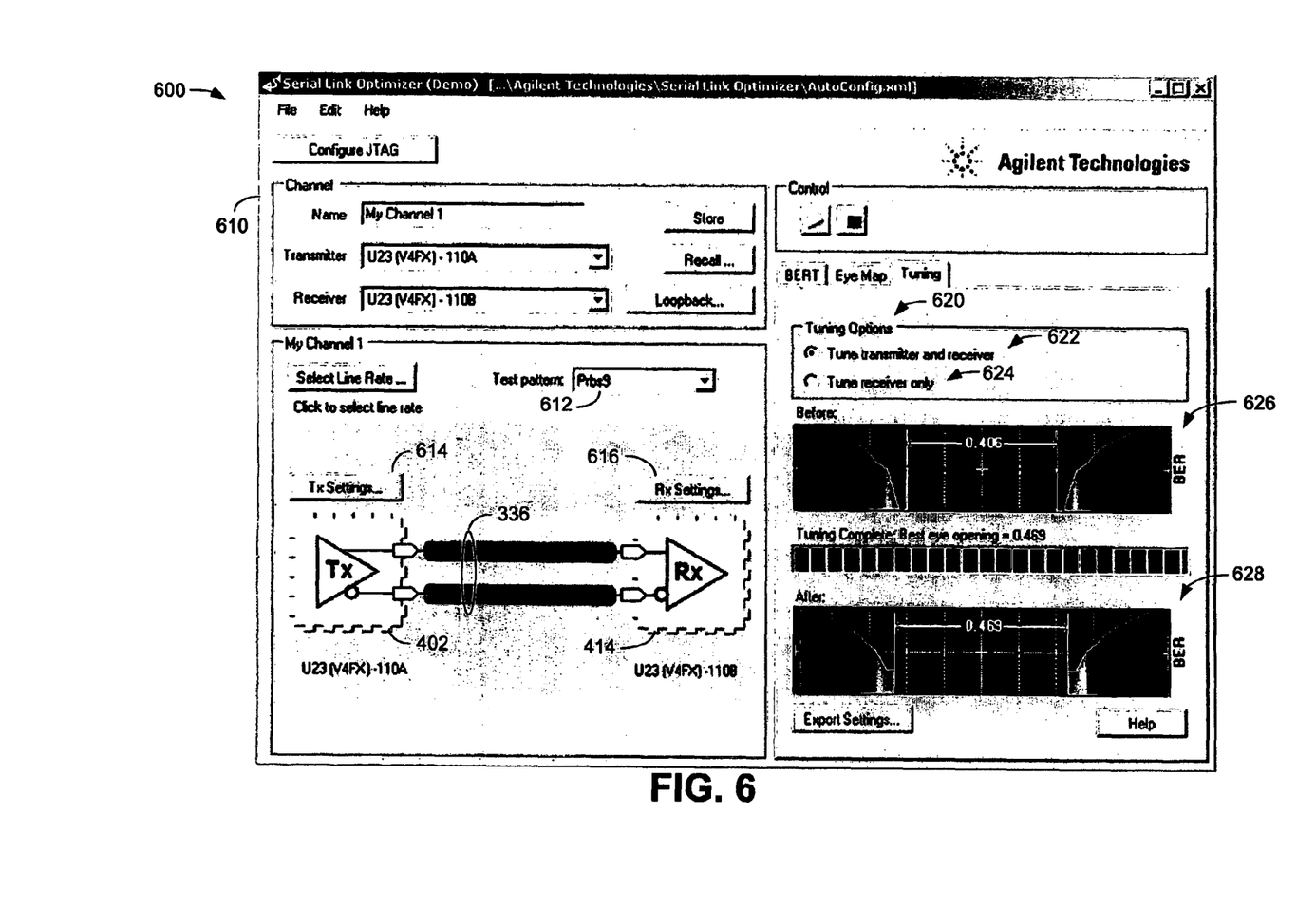
FIG. 6 is a graphical illustration showing an example of a graphical user interface provided to a user.

FIG. 6 is a graphical illustration 600 showing an example of a graphical user interface provided to a user. The graphical user interface 610, which is provided by the user interface 250 (FIG. 2), provides visibility and control of the transmitter and receiver of an exemplary communication link.

Figure 7:
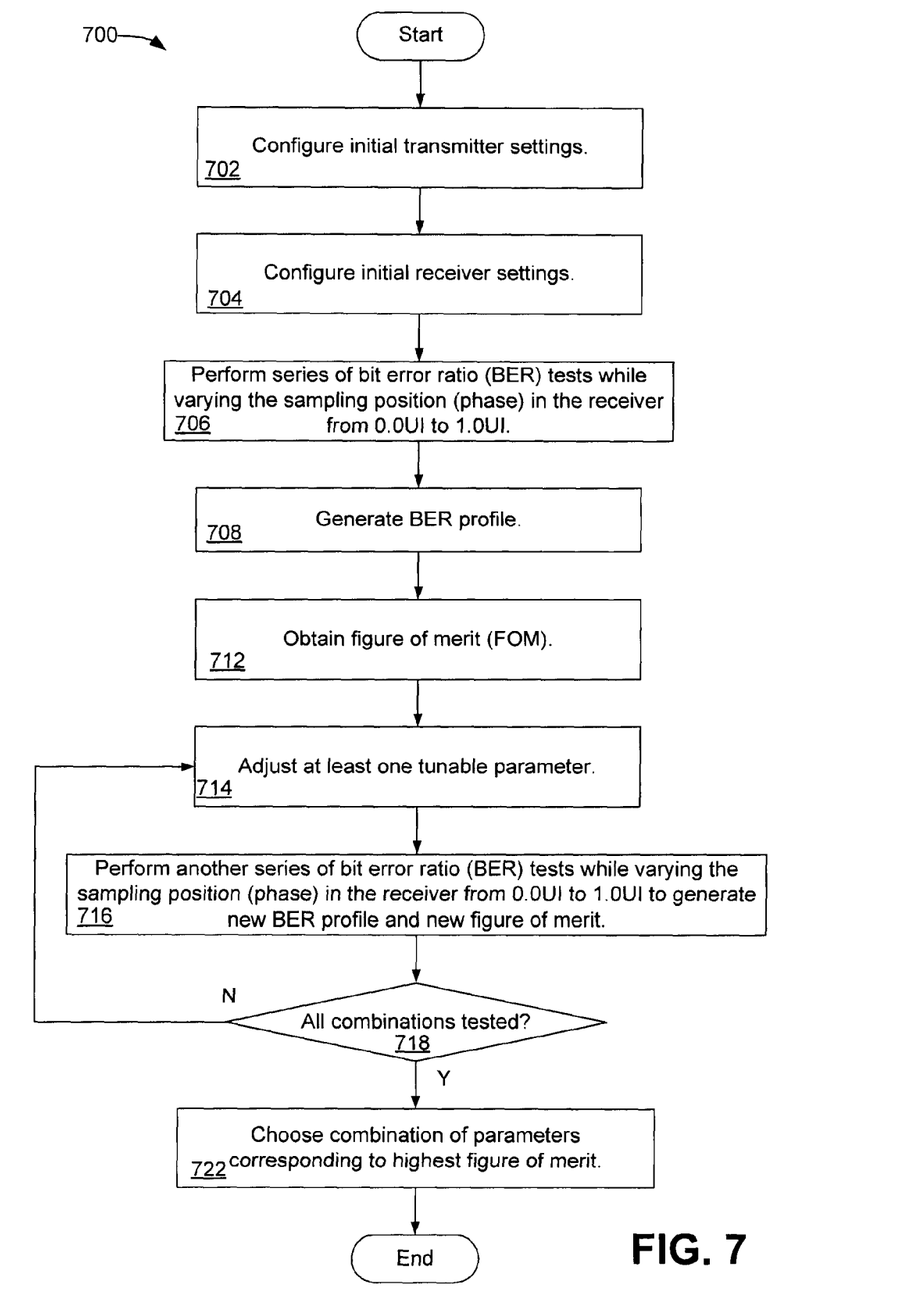
FIG. 7 is a flow chart describing the operation of an embodiment of the system and method for adjusting a serial communications link.

FIG. 7 is a flow chart 700 describing the operation of an embodiment of the system and method for adjusting a serial communications link. The blocks in the flowchart 700 can be performed in the order shown, out of the order shown, or substantially in parallel. Further, the description of the flowchart 700 will make reference to the arrangement of transmitters and receivers depicted in FIG. 4. However, the method described in the flowchart 700 is applicable to any serial communications link having at least one adjustable transmitter and/or at least one adjustable receiver.

In block 702 the initial settings of the transmitter 402 are configured. These settings include, for example, the data pattern to be sent and the speed at which the data pattern will be sent. As an example, and referring to FIG. 6, the test pattern can be a PRBS9 test pattern, which is known to those skilled in the art and which is illustrated at 612, or can be another test pattern. Other transmitter settings can be chosen by selecting the transmit settings button 614. Selecting the transmit settings button 614 opens an additional selection window (not shown) to adjust various transmitter parameters.

In block 704, the initial settings of the receiver 414 are configured. These settings include, for example, receiver sensitivity. The receiver settings can be chosen by selecting the receiver settings button 616. Selecting the receiver settings button 616 opens an additional selection window (not shown) to adjust various receiver parameters.

In block 706, the link tuning software 240 performs a series of bit error ratio (BER) measurements while varying the sampling position (phase) of the recovered data signal in the receiver from 0.0 to 1.0 UI. Such a series of BER measurements is sometimes referred to as a "sweep." Alternatively, the sampling position (phase) of the recovered data signal is varied over whatever range is supported by the particular receiver. The result of this series of BER measurements is a profile of the BER as a function of receiver phase. The BER profile is generated in block 708. The BER profile is known in the art as a "bathtub curve". This curve is shown in FIG. 6 using reference numeral 626 for one such sweep. In this case there is a clear receive window, also referred to as an "eye opening" of 0.406 UI, where no errors were detected in the received data. In general, a wider opening is preferable because a wider opening means that the jitter in the data signal is less likely to violate the nominal sample position at 0.5 UI.

In block 712, a single "figure of merit" (FOM) is obtained. The objective of the sweep is to obtain the single figure of merit value that characterizes the quality of the serial communications link 336 when operated with a given set of transmitter and/or receiver settings, such as the settings chosen in blocks 702 and 704.

The figure of merit chosen in this embodiment is calculated as follows: (a) if a clear eye opening is found in the BER sweep, FOM=1.0+openingUI, or (b) if no eye opening is found, FOM=1.0−BERmin, the lowest BER found in the sweep. With the FOM defined this way, the quality of the serial data communications link can be characterized using a simple numerical comparison.

In block 714 the link tuning software 240 adjusts at least one tunable parameter of the transmitter, at least one tunable parameter of the receiver, or at least one tunable parameter of the transmitter and the receiver.

In block 716, the link tuning software 240 then takes another BER sweep for the new combination of settings applied in block 714 and generates a new figure of merit for the settings applied in block 714. In block 718 it is determined if all combinations of transmitter and receiver settings have been tested. If all combinations of transmitter and receiver settings have not been tested, then the process returns to block 714. If all combinations of transmitter and receiver settings have been tested, the process proceeds to block 722 where the highest figure of merit (with its corresponding parameter settings) is chosen as "optimal." A curve 628 corresponding to the optimal figure of merit is shown in FIG. 6.

It can be appreciated that an exhaustive search through all combinations may be time consuming. An alternative is to determine the gradient of the figure of merit through the N-space of N different parameters and follow the gradient "uphill" to the highest figure of merit. This technique works best if the performance of the transmitter, receiver and the serial data communications link are consistent from test to test over varying performance parameters with a single global maximum value for the figure of merit.

The foregoing detailed description has been given for understanding exemplary implementations of the invention and no unnecessary limitations should be understood therefrom as modifications will be obvious to those skilled in the art without departing from the scope of the appended claims and their equivalents.

What is claimed is:

1. A system for adjusting a serial communications link coupling together a transmitter and a receiver within a system under test, the system comprising:
    a controller coupled to at least one of the transmitter and the receiver via a joint test action group (JTAG) interface; and
    logic configured to adjust at least one tunable parameter of the at least one of the transmitter and the receiver via the JTAG interface, under control of the controller, to optimize a performance of the serial data communications link.

2. The system of claim 1, in which the transmitter has a tunable parameter.

3. The system of claim 1, in which the receiver has a tunable parameter.

4. The system of claim 1, in which the transmitter and the receiver are located on separate scan chains.

5. The system of claim 1, in which the transmitter and the receiver are located on the same scan chain.

6. The system of claim 1, in which the logic configured to adjust the at least one tunable parameter automatically identifies at least one of the transmitter and the receiver.

7. The system of claim 6, in which the logic configured to adjust the at least one tunable parameter controls at least one additional serial communications links within the system under test in the same session.

8. A computer-readable medium having a program stored thereon, the program comprising:
    logic configured to be executed by a processor to adjust at least one tunable parameter of at least one of a transmitter and a receiver within a system under test to optimize a performance of a serial data communications link having the transmitter and the receiver coupled thereto, in which the logic is coupled to the at least one of the transmitter and the receiver over a joint test action group (JTAG) interface.

9. The program of claim 8, wherein the logic configured to be executed by the processor adjusts at least one tunable parameter in the transmitter.

10. The program of claim 8, wherein the logic configured to be executed by the processor adjusts at least one tunable parameter in the receiver.

11. The program of claim 8, wherein the transmitter and the receiver are located on separate scan chains.

12. The program of claim 8, wherein the transmitter and the receiver are located on the same scan chain.

13. The program of claim 12, further comprising logic configured to be executed by a processor to automatically identify at least one of the transmitter and the receiver.

14. A method for adjusting a serial communications link, comprising:
    coupling at least one transmitter and at least one receiver via a serial data communications link, wherein at least one of the transmitter and the receiver has at least one tunable parameter;
    coupling at least one controller to at least one of the transmitter and the receiver via a joint test action group (JTAG) interface; and
    adjusting the at least one tunable parameter via the JTAG interface under control of the controller to optimize a performance of the serial data communications link.

15. The method of claim 14, in which the transmitter has a tunable parameter.

16. The method of claim 14, in which the receiver has a tunable parameter.

17. The method of claim 14, in which at least one of the transmitter and the receiver are located on separate scan chains.

18. The method of claim 14, in which at least one of the transmitter and the receiver are located on the same scan chain.

19. The method of claim 18, further comprising automatically identifying at least one transmitter and at least one receiver.

* * * * *